US006393061B1

United States Patent
Owechko

(10) Patent No.: US 6,393,061 B1
(45) Date of Patent: May 21, 2002

(54) METHOD FOR REDUCING BLOCKING ARTIFACTS IN DIGITAL IMAGES

(75) Inventor: Yuri Owechko, Newbury Park, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/079,769

(22) Filed: May 15, 1998

(51) Int. Cl.$^7$ ................................................ H04N 7/12
(52) U.S. Cl. ................................................ 375/240.29
(58) Field of Search ..................... 375/240.16, 240.2, 375/240.26, 240.27, 240.29; 708/203; 382/246, 253, 275, 260, 199, 242; 358/463; H04N 7/12

(56) References Cited

U.S. PATENT DOCUMENTS 4,941,043 A * 7/1990 Jass .................... 375/240.2
5,359,676 A * 10/1994 Fan ..................... 382/246
5,594,816 A * 1/1997 Kaplan et al. ........ 358/463
5,608,652 A * 3/1997 Astle ................... 708/203
5,867,221 A * 2/1999 Pullen et al. ........ 375/240.16

* cited by examiner

*Primary Examiner*—Nhon Diep
(74) *Attorney, Agent, or Firm*—V. D. Duraiswamy; M. W. Sales

(57) ABSTRACT

A method for reducing blocking artifacts in digital images is disclosed. An original image is segmented into pixel blocks and mapped into a set of images associated with a predetermined compression format to produce a second image. Pixel block border pixel values in the second image are compared and adaptively adjusted to produce a third image with reduced border discontinuities. Non-border pixels within the third image are replaced with pixels from the original image to produce a fourth image that maintains fidelity to the original image. A blockiness metric may be used to repeat the mapping, comparing, adjusting, and replacing steps until blockiness crosses a predetermined level.

19 Claims, 3 Drawing Sheets

METHOD FOR REDUCING BLOCKING ARTIFACTS IN DIGITAL IMAGES

BACKGROUND OF THE INVENTION

(a) Field of the Invention

The present invention relates generally to a pre-preprocessing method for digital images. More particularly, it relates to a digital pre-processing method that iteratively distorts pixels in an image to minimize perceived blockiness following a digital compression and decompression cycle.

(b) Description of Related Art

Digital image compression methods selectively quantize image information to reduce the amount of information needed to reconstruct a reasonable approximation of the original image. Quantization compacts image information, but it inherently sacrifices detail and the overall perceived image quality.

There are a variety of existing compression standards for digital images and video. For example, JPEG, H.263, MPEG-1, MPEG-2, and MPEG-4 all use a block-based discrete cosine transform (DCT) compression method. Block-based DCT methods sub-divide an original image into a matrix of pixel blocks. Typically, each block contains 64 pixels (8×8), and each pixel has a value between 0 and 255. Each block is represented by a vector of 64 DCT coefficients ranging in value from 0 to 255.

Digital compression methods seek to quantize and thereby reduce the number of coefficients needed to reconstruct an approximation of an original image. For example, the range of coefficient values may be reduced to values between 0 and 15 to provide a four-fold reduction in the information needed to describe an image. Quantized coefficient values may be predetermined by the compression standard, or may vary for each compressed image.

Blocking artifacts are a highly objectionable type of distortion that result from using standard digital image compression methods. Blocking artifacts arise from discontinuities on the boundaries between pixel blocks in the reconstructed image. Image blockiness results when the pixel block border discontinuities are large enough to prevent a perceived seamless blending of adjacent blocks, and the reconstructed image appears to be an assembly of discrete blocks. Blockiness is most pronounced within the uniform regions of a reconstructed image because the human eye can discriminate extremely small discontinuities in an otherwise uniform image field.

A number of post processing methods are available to reduce the blockiness of images that have been reconstructed (decompressed) from compressed information. These methods typically apply a digital filter to the image that smooths pixel block border discontinutites. However, post processing methods are disadvantageous because they require modification of the decompression method at the individual users' systems.

A few commercially available MPEG compression programs use pre-processing digital filtering methods to reduce spatial and temporal noise in the original image. Although such pre-processing compression methods can improve reconstructed image quality for a given compression ratio, they do not work to minimize blockiness.

Thus, a need exists for a pre-processing method of reducing the blockiness of images that are reconstructed using standard digital image compression formats and methods.

SUMMARY OF THE INVENTION

In accordance with one aspect of the present invention, a method for reducing blocking artifacts associated with compression of a digital image comprises steps of segmenting the image, mapping pixel blocks, comparing pixel values, adjusting pixel values, and replacing pixel values. An original image is segmented into pixel blocks. The pixel blocks are mapped into a predetermined set of images associated with an image compression format to produce a second image. Adjacent border pixels within the second image are compared and adjusted to produce a third image. Non-border pixels within the third image are replaced with pixels from the original image to produce a fourth image.

In accordance with another aspect of the present invention, a method for reducing blocking artifacts associated with compression of a digital image comprises steps of segmenting the image, calculating a blockiness measure, mapping pixel blocks, comparing pixel values, replacing pixel values, and repeating the steps until the blockiness measure crosses a predetermined level. An original image is segmented into pixel blocks. The pixel blocks are mapped into a predetermined set of images associated with an image compression format to produce a second image. A blockiness measure is calculated for the second image, and the blockiness measure is compared to a predetermined value. Adjacent border pixels within the second image are compared and adjusted to produce a third image. Non-border pixels within the third image are replaced with pixels from the original image to produce a fourth image. The steps of mapping, comparing, adjusting, and replacing are repeated until the blockiness measure crosses a predetermined threshold.

The invention itself together with further objects and attendant advantages, will best be understood by reference to the following detailed description, taken in conjunction with the accompanying drawings.

DESCRIPTION OF THE PREFERRED EMBODIMENTS

Standard digital image compression methods tend to produce highly objectionable distortions along the pixel block borders of the reconstructed image. Post-processing methods to correct for digital image blockiness are not practical because they require modification of the decompression method at each user terminal. Additionally, existing pre-processing methods do not specifically address the problem of blockiness in the reconstructed image. The present invention overcomes these problems by providing a digital image pre-processing method that specifically reduces blockiness in reconstructed images.

Figure 1:
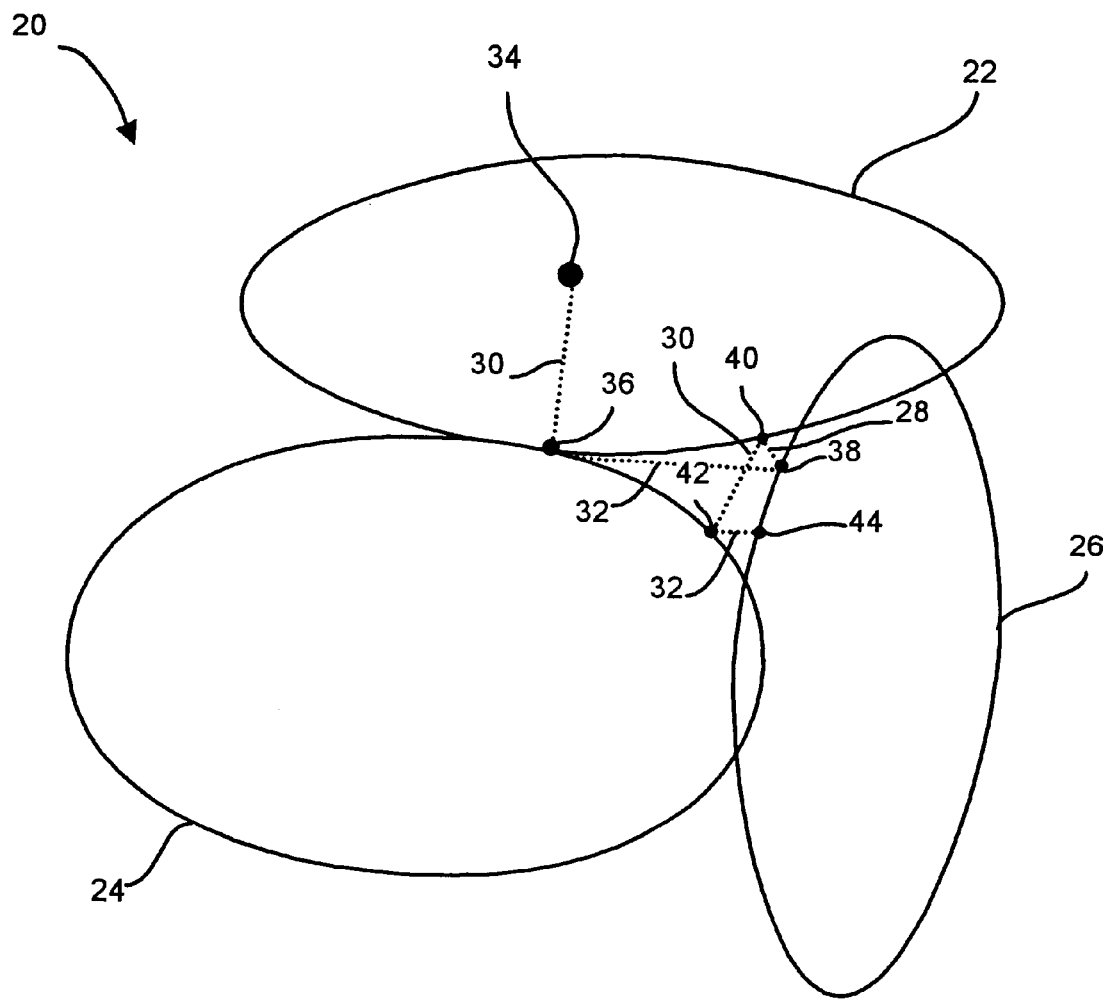
FIG. 1 illustrates a conceptual overview of the present invention.

Depicted in FIG. 1 is conceptual overview of a pre-processing method for reducing blockiness in reconstructed digital images. Pre-processing method 20 comprises a first convex set 22, a first projection operator 28, a second convex set 24, a second projection operator 30, a third convex set 26, and a third projection operator 32.

It is well known that constrained optimization problems can be represented and solved using convex sets and projection operators. For pre-processing method 20 each convex set represents a constraint in the problem, and each element of a convex set is a vector representing an image. Thus, each set contains multiple images having desirable or constrained characteristics.

The projection operators work as mapping functions that find a member of a given set that is closest to a given vector. First projection operator 28 finds members of first convex set 22, second projection operator 30 finds members of second convex set 24, and third projection operator 32 finds members of third convex set 26. Established theory for convex sets shows that an element common to all the sets can be found through iterative use of the projection operators. If a common element does not exist, then iterative projection will result in finding an optimal element that is closest to being a member of all the sets.

The first set 22 contains all images that have non-block boundary pixels equal to an original image 34. The second set 24 contains all images that can be reconstructed by a predetermined digital image decompressor. The third set 26 contains all images that have blocking artifacts or a blockiness measure below a predetermined level. Therefore, finding an element that is the closest to being a member of all three sets will result in an image that maintains fidelity to the original image, that can be reconstructed by the decompressor, and that has a blockiness below a predetermined level.

Original image 34 is located within the first set 22. Applying second projection operator 30 to original image 34 finds an image 36 in the second set 24 that can be represented by the decompressor and that is closest to original image 34. Applying third projection operator 32 to image 36 finds an image 38 in the third set 26 that has the desired blockiness and that is closest to image 36. Applying first projection operator 28 to image 38 finds an image 40 in the first set 22 that has original non-block boundary pixels and that is closest to image 38. Those skilled in the art will immediately recognize that an iterative projection between sets can continue through an image 42, and an image 44, but may never identify a single image that completely satisfies all three sets. The iterative projections may converge on a region defined by three images (one in each set) so that subsequent iterations will cycle between these images without further convergence. Therefore, to complete the iterative process a final image may be selected from one of the three images.

Figure 2:
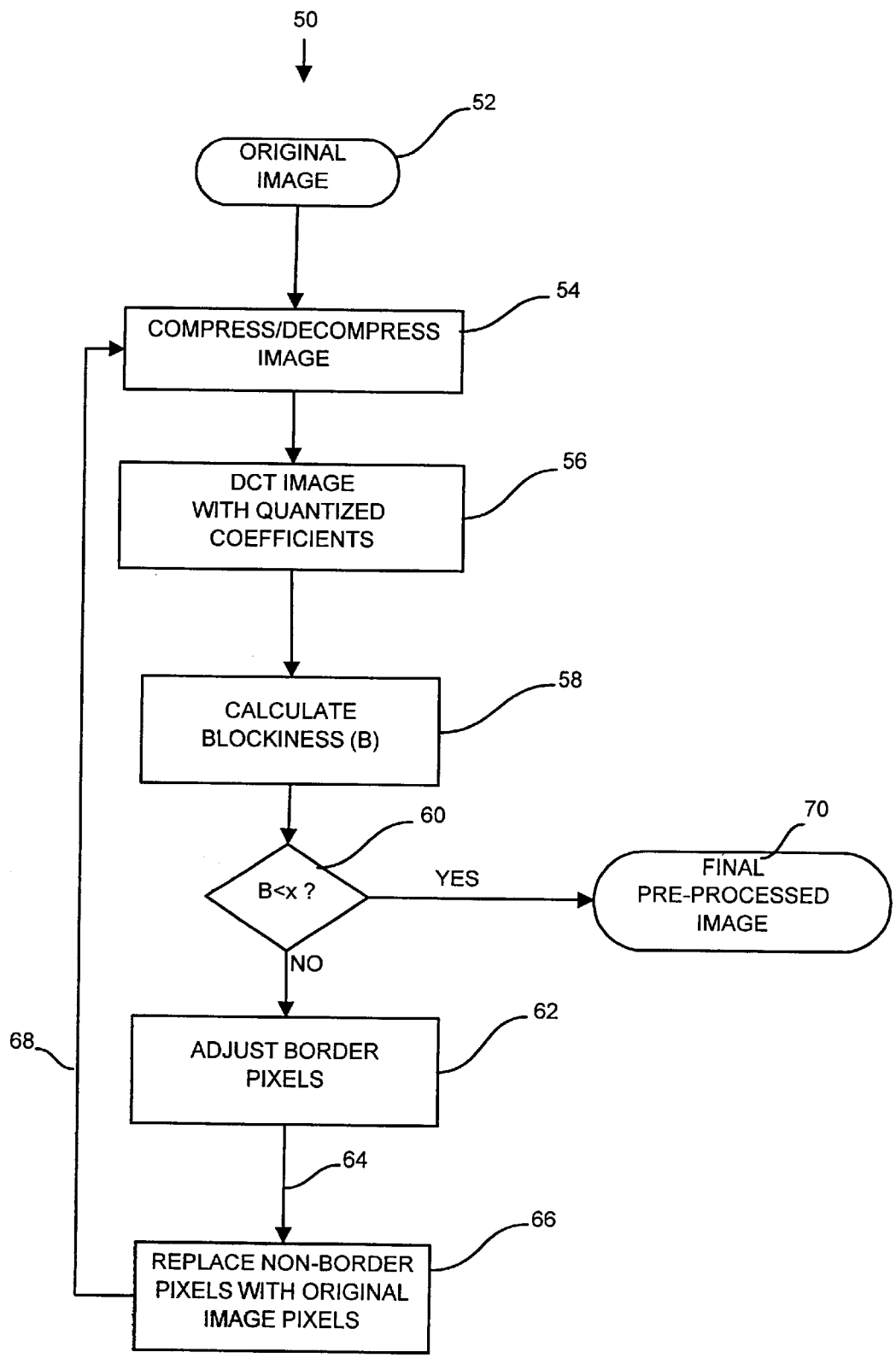
FIG. 2 illustrates a flowchart for one embodiment of the present invention.

The above conceptual overview provides a general framework for a multitude of possible embodiments of the present invention. Depicted in FIG. 2 is a flowchart that more particularly defines one possible embodiment of the present invention. Pre-processing method 50 receives an original image 52. The image 52 may be a bitmap or a variety of other graphic file structures. The image 52 passes through an operation 54 that first compresses and then decompress it. Operation 54 may use a variety of standard compression formats such as JPEG, H.263, MPEG-1, MPEG-2, or MPEG-4. Operation 54 produces a result 56 that is an image vector with quantized coefficient values. The coefficient values may be pre-determined from the type of compression format used in operation 54, or may be generated specifically for the image 52.

Operation 58 calculates the blockiness of result 56 by summing the differences between pixel values that lie along the borders between pixel blocks. Summing pixel value differences provides a straightforward technique of measuring blockiness, however, other more complex pixel value functions associated with perceived blockiness may be used to achieve a similar result. Some examples of some other blockiness measures used in post processing applications are found in the article "A Distortion Measure for Blocking Artifacts in Images Based on Human Visual Sensitivity" by S. A. Karunasekera et. al., appearing in *IEEE Transactions on Image Processing*, Vol. 4, June 1995, at pp. 713–724. Operation 58 calculates blockiness using either border rows or columns, or some combination of both. For the present embodiment, pixel blocks contain 64 pixels in eight rows and eight columns, and borders are two pixels wide with one pixel width in each of the adjacent pixel blocks. Other pixel block, and border sizes may be used to achieve a similar result.

An operation 60 compares the blockiness measure to a pre-determined value. If the blockiness is greater than the pre-determined value then an operation 62 adjusts the border pixel values of result 56; otherwise the method 50 provides result 56 as a final pre-processed image 70.

Operation 62 performs a weighted average of adjacent border pixel values. The weighting coefficients are preferably adaptive to the normalized standard deviation of pixel values within a pixel block. For example, the following functions can provide such an adaptive weighting:

$$f_i = \alpha_{mn} f_i + (1-\alpha_{mn}) f_{i+1}$$
$$f_{i+1} = (1-\alpha_{mn}) f_i + \alpha_{mn} f_{i+1}$$
$$\alpha_{mn} = \gamma/2 [1+(\sigma_{mn}/\sigma_{max})^\beta]$$

where:
$f_i$=border pixel value
$f_{i+1}$=adjacent border pixel value
$\sigma_{mn}$=std. dev. of pixel values in block mn
$\sigma_{max}$=max. pixel block std. dev. (entire image)
$\gamma$=damping coefficient
$\beta$=acceleration factor Using the above equations, operation 62 will produce weighting coefficients that make very little adjustment to the border pixels of blocks having a high standard deviation of pixel values (i.e. lots of image detail or texture). Conversely, for pixel blocks that have a low pixel value standard deviation the weighting coefficients will tend to make large adjustments to the border pixel values so that their border discontinuities are diminished. This kind of adaptive weighting corresponds to the sensitivities of the human eye. As indicated above, the human eye more easily recognizes image distortion where the field of the image is relatively uniform (i.e. a low standard deviation of pixel values).

Operation 62 adjusts the values of individual pixel pairs across all border rows and columns and provides an adjusted image 64. Experimental measurements on a variety of digital images has shown that the best pre-processing occurs when the damping coefficient $\gamma=2$, and the acceleration factor $\beta=2$. However, a broad optimum exists, and other values for $\gamma$ and $\beta$ may be chosen to achieve a desired result. Those skilled in the art will also recognize that a variety of alternative weighting functions in addition to those shown above could be used to adaptively adjust border pixel values.

An operation 66 resets the non-border pixel values of adjusted image 64 to those of original image 52. Operation 66 provides an intermediate image 68 that has pixel blocks containing non-border pixel values that are identical to the original image 52, and border pixels that have been adjusted by operation 62. Intermediate image 68 is then returned to operation 54. Operations 54, 58, 60, 62, and 66 are repeated until the method 50 yields a final pre-processed image 70.

Figure 3:
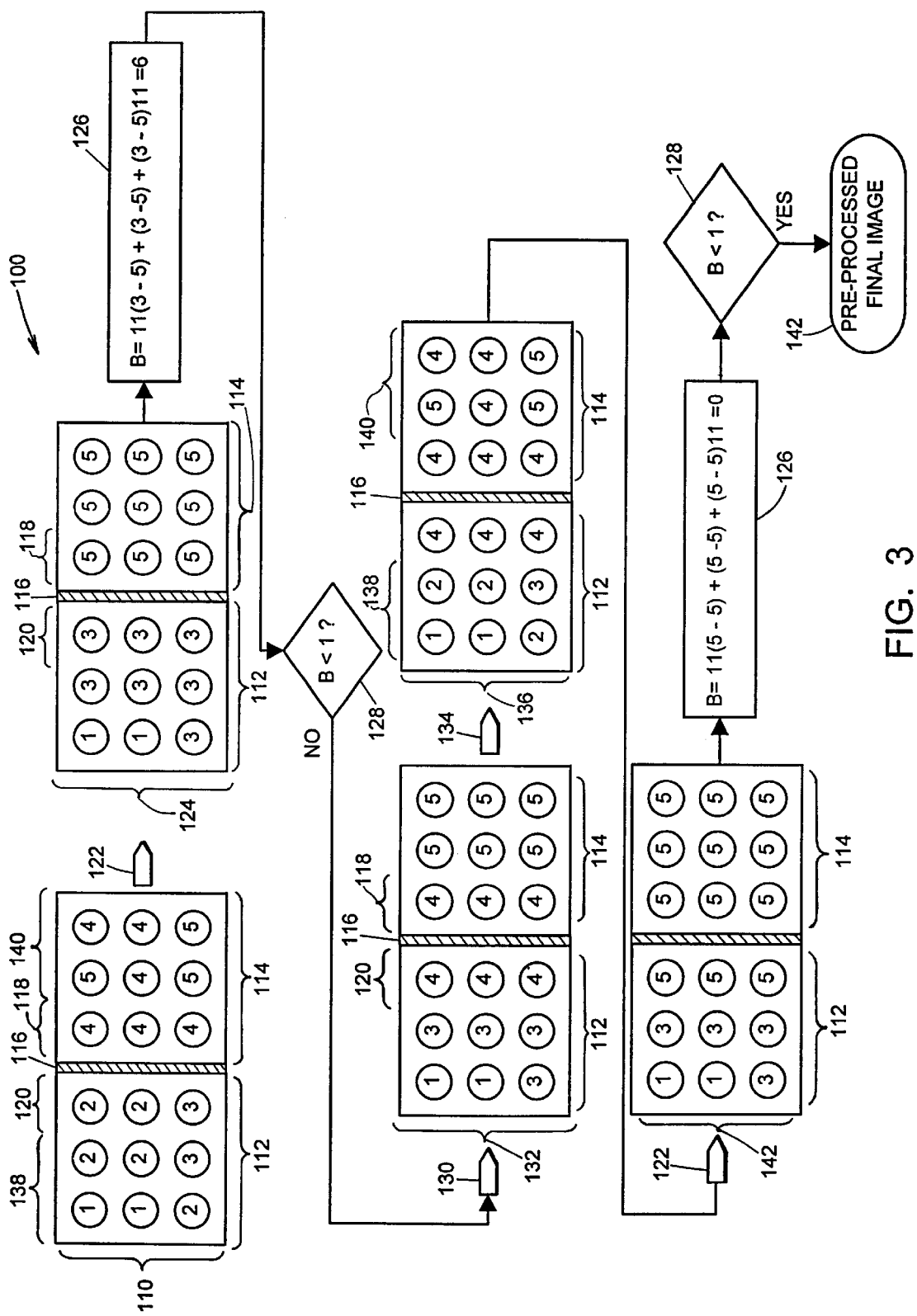
FIG. 3 illustrates a specific example of one embodiment of the present invention operating on a simple image.

Shown in FIG. 3 is a specific example 100 of the method of the present invention operating on an original digital image 110. Original digital image 110 comprises a first pixel block 112 and a second pixel block 114. Each pixel block includes nine individual pixels wherein pixel values range from one to five. Three pixels in each block form a first border column 120 and a second border column 118 along a pixel block border 116. Six pixels in each block form a first group of non-border pixels 138 and a second group of non-border pixels 140.

An operation 122 compresses and then decompresses image 110 and produces a DCT image 124 with quantized coefficients (1,3, or 5). An operation 126 calculates the blockiness of image 124 by summing the differences between pixel values in the border columns 120 and 118.

An operation 128 compares the blockiness measure of image 124 to a predetermined value. The blockiness measure exceeds the predetermined value and DCT image 124 is further processed by an operation 130. Operation 130 produces an intermediate image 132 by adjusting the pixel values in the border columns 120 and 118 of DCT image 124. For this example, pixel adjustments are made by replacing adjacent pixel values with their equally weighted average.

An operation 134 produces an adjusted image 136 by replacing the pixel values in the nonborder pixels 138 and 140 of intermediate image 132 with the non-border pixels 130 and 140 from original image 110.

The operation 122 now compresses and decompresses adjusted image 136 to produce a second DCT image 142. The operation 126 calculates the blockiness of second DCT image 142 and the operation 128 compares the blockiness measure to a predetermined value. The blockiness measure falls below the predetermined value and the second DCT image becomes a final processed image 142.

Of course, it should be understood that a range of changes and modifications can be made to the preferred embodiment described above. For example, although the method of the present invention reduces the blockiness of a digitally compressed image having a given compression ratio it may conversely be used to increase the compression ratio for a given level of blockiness. Experiments have shown that the method of the present invention permits JPEG image compression ratios to be increased approximately 20% to 30% before blockiness becomes apparent. It is therefore intended that the foregoing detailed description be regarded as illustrative rather than limiting and that it be understood that it is the following claims, including all equivalents, which are intended to define the scope of this invention.

What is claimed is:

1. A method for reducing the blocking artifacts associated with compression of a digital image comprising the steps of:

segmenting the digital image into first and second blocks of pixels;

mapping said pixel blocks to the closest members from a predetermined set of images to produce a second image comprising a first mapped pixel block and a second mapped pixel block;

comparing a first pixel value in said first mapped pixel block to a second pixel value in said second mapped pixel block;

adjusting said first pixel value and said second pixel value to form a third image;

replacing a third pixel value in said third image with a fourth pixel value from said digital image to produce a fourth image.

2. The method of claim 1, wherein the step of comparing comprises an arithmetic difference between pixel values.

3. The method of claim 1, wherein the first and second pixel values are border pixels of the first and second mapped pixel blocks.

4. The method of claim 1, wherein the step of adjusting comprises a weighted averaging of the first and second pixel values.

5. The method of claim 1, wherein the steps of comparing and adjusting are repeated for a plurality of pixel values.

6. The method of claim 1, wherein the steps of comparing and adjusting are repeated for a plurality of border pixel values.

7. The method of claim 1, wherein the step of replacing is repeated for a plurality of pixels.

8. The method of claim 1, wherein the step of replacing is repeated for a plurality of non-border pixels.

9. The method of claim 1, wherein the fourth pixel value is a non-border pixel.

10. The method of claim 1, further comprising the step of calculating a blockiness measure.

11. The method of claim 10 wherein the steps of mapping, comparing, adjusting, replacing, and calculating are repeated until the blockiness measure crosses a predetermined value.

12. The method of claim 10, wherein the step of calculating comprises a sum of differences between a plurality of pixels in the first and second mapped blocks.

13. The method of claim 10, wherein the step of calculating comprises a sum of differences between a plurality of border pixels in the first and second mapped blocks.

14. The method of claim 1, wherein the step of mapping comprises compression and decompression.

15. The method of claim 1, wherein the compression and decompression are performed according to a discrete cosine transform (DCT).

16. The method of claim 1, wherein the DCT is block-based.

17. The method of claim 1, further comprising the step of adaptively weighting the first pixel value and the second pixel value according to a normalized deviation of pixel values along a border between the first block of pixels and the second block of pixels.

18. The method of claim 1, wherein the step of mapping comprises using a compression standard for digital images and video that uses a block-based discrete cosine transform (DCT) compression method.

19. The method of claim 18, wherein the compression standard is selected from the group comprising: MPEG-1, MPEG-2, and MPEG-4.

* * * * *